Patented Aug. 24, 1948

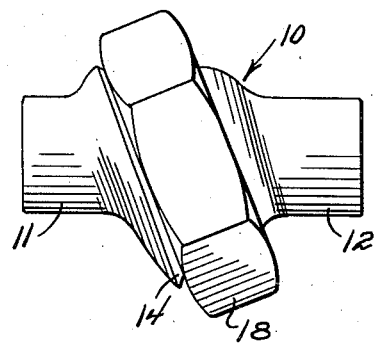
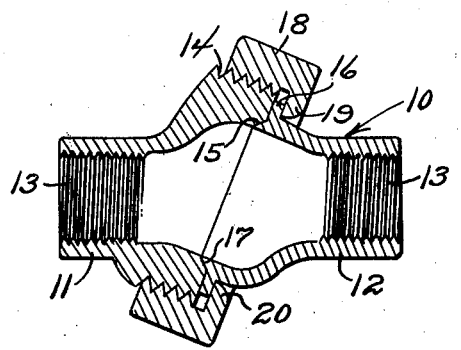
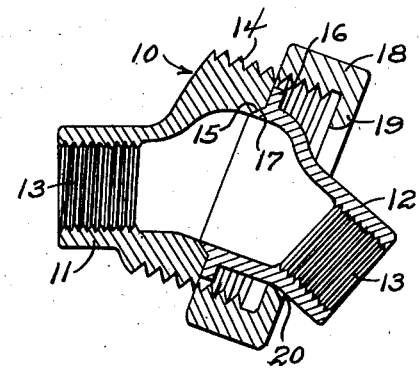

2,447,947

UNITED STATES PATENT OFFICE 2,447,947

VARIABLE UNION

George K. Larson, Smethport, and August A. Larson, Johnsonburg, Pa.

Application June 24, 1947, Serial No. 756,760

1 Claim. (Cl. 285—122)

1

This invention relates to a variable union or pipe coupling which will connect the ends of two pipes in approximately any angle desired, ranging from a straight course to a course practically through an entire circle.

An object of the invention is to provide a union or pipe coupling that will obviate the straining or bending of pipes in the connection thereof, will permit full removal of the coupling nut, and will not restrict in any manner the fluid passing therethrough.

With the above and other objects and advantages in view, the invention consists of the novel details of construction, arrangement and combination of parts more fully hereinafter described, claimed and illustrated in the accompanying drawing in which:

Figure 1 is an elevational view of an embodiment of the invention;

Figure 2 is a sectional view showing the device connected in a straight course and Figure 3 is a sectional view showing the device connected in a 45 degree angled course.

Referring more in detail to the drawing, the reference numeral 10 designates the union embodying the invention.

The union 10 comprises the hollow heads or sections 11 and 12 respectively, which have internally threaded sleeves 13 to be connected to a pipe, not shown.

The head 11 is provided with external threads 14 which surround a female seat or recess 15 which is formed at an angle of approximately twenty-two and a half degrees. The head 12 is provided with an annular flange 16 which surrounds the beveled annular end or lip 17 of the head 12, and the end is formed at an angle of twenty-two and a half degrees to be fitted into the seat 15 of the head 11.

The coupling ring or nut 18 is internally threaded to engage the threads 14 of the head 11, and is provided within an inturned annular flange 19 which abuts the flange 16 on the head 12 when the ring is threaded onto the threads 14.

The outer periphery of the ring 18 is curved as at 20 to permit the coupling ring 18 to be completely disengaged from the threads 14. Thus when the seat 15 and end 17 are engaged, the union and pipes connected thereto will mesh without strain or the bending of the pipes or the heads of the union.

This overcomes a great disadvantage prevalent in most unions, of this type, since the engaging faces will not always properly aline themselves when the coupling ring is threadably mounted on one of the heads.

There has thus been provided a union which, it is believed, will overcome many of the disadvantages present in unions in use at the present time, since it means perfect engagement of the angled faces of the heads and permits full removal of the coupling ring from the threads on the heads during the coupling thereof.

It is believed that from the foregoing description, the structure and operation of the device will be apparent to those skilled in the art, and it is to be understood that changes in the minor details of construction may be resorted to, provided they fall within the spirit of the invention and the scope of the appended claim.

Having thus described the invention, what is claimed as new and desired to be secured by Letters Patent is:

In a universal pipe union, the combination, which comprises, an internally threaded female sleeve having an enlarged portion at the end the face of which is positioned at an angle in relation to the axis thereof, said enlarged portion having threads on the outer surface with the axis of the threads perpendicular to the face and having an annular recess in the face with a beveled surface, the inner end of the opening in said enlarged portion meeting the face thereof at a right angle, a complementary internally threaded male sleeve having an enlarged end with the face thereof positioned at an angle in relation to the axis thereof, and having an annular flange around the outer surface flush with the face and a beveled lip extending from the face and positioned in the annular recess of the female sleeve with a ground joint fit when the parts are assembled, the inner end of the opening in the enlarged portion of the sleeve meeting the said face at a right angle, and a coupling nut having internal threads to correspond with the threads of the enlarged end of the female sleeve and an internal annular flange positioned to clamp the flange of the male sleeve against the face of the enlarged end of the female sleeve, said enlarged end of the male sleeve having a straight portion of sufficient length to accommodate the nut with the nut unscrewed from the threads of the enlarged end of the female sleeve wherein the outer face of the nut is positioned behind the face of the enlarged end of the male sleeve, in the unscrewed position.

GEORGE K. LARSON.
AUGUST A. LARSON.

REFERENCES CITED

The following references are of record in the file of this patent:

UNITED STATES PATENTS

| Number | Name | Date |
|---|---|---|
| 954,504 | Drew | Apr. 12, 1910 |
| 1,020,839 | Niesen | Mar. 19, 1912 |
| 1,125,642 | Blanchard | Jan. 19, 1915 |
| 1,285,849 | Walling | Nov. 26, 1918 |